United States Patent
Larsson et al.

(10) Patent No.: US 8,159,954 B2
(45) Date of Patent: Apr. 17, 2012

(54) METHOD AND ARRAGEMENT FOR ADVANCED ROUTING METRICS IN MULTIHOP NETWORKS

(75) Inventors: Peter Larsson, Solna (SE); Niklas Johansson, Sollentuna (SE); Rong Hu, Hangzhou (CN); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 777 days.

(21) Appl. No.: 11/792,286

(22) PCT Filed: Mar. 8, 2005

(86) PCT No.: PCT/SE2005/000339
§ 371 (c)(1),
(2), (4) Date: Jun. 5, 2007

(87) PCT Pub. No.: WO2006/096097
PCT Pub. Date: Sep. 14, 2006

(65) Prior Publication Data
US 2008/0232258 A1    Sep. 25, 2008

(51) Int. Cl.
*G06F 11/00* (2006.01)
(52) U.S. Cl. .............. 370/238; 370/230.1; 370/232; 370/234
(58) Field of Classification Search .......... 370/238, 370/230.1, 232, 234
See application file for complete search history.

(56) References Cited

U.S. PATENT DOCUMENTS

| | | |
|---|---|---|
| 2002/0051425 A1 | 5/2002 | Larsson |
| 2002/0102950 A1* | 8/2002 | Gore et al. .............. 455/101 |
| 2003/0161268 A1* | 8/2003 | Larsson et al. ......... 370/229 |
| 2004/0156345 A1 | 8/2004 | Steer et al. |
| 2004/0157613 A1* | 8/2004 | Steer et al. ............. 455/446 |
| 2004/0181419 A1 | 9/2004 | Davis et al. |
| 2004/0233918 A1 | 11/2004 | Larsson et al. |
| 2006/0146718 A1* | 7/2006 | Yarvis et al. .......... 370/238 |
| 2008/0056217 A1* | 3/2008 | Hara et al. ............. 370/342 |

FOREIGN PATENT DOCUMENTS

EP    1 460 813 A1    9/2004
(Continued)

OTHER PUBLICATIONS

International Search Report for PCT/SE2005/000339 mailed Oct. 11, 2005.

(Continued)

*Primary Examiner* — Huy D Vu
*Assistant Examiner* — Omer Mian
(74) *Attorney, Agent, or Firm* — Nixon & Vanderhye P.C.

(57) ABSTRACT

The inventors have envisioned a multihop network scenario in which nodes are equipped with advanced multi-antenna arrangements, and recognized the advantage of exploring the presence of such advanced antenna arrangements in multihop network nodes for the specific purpose of determining link cost for routing in the network. Link cost is determined for a wireless link between a pair of nodes in the network based on multi-channel characteristics between the nodes, where at least one of the nodes is configured for operation with multiple antennas to provide for multiple channels. These multi-channel characteristics may for example be determined based on explicit channel matrix estimation and/or the number of transmit and receive antennas or other information on the antenna capabilities of the involved nodes. The determined link cost information may subsequently be used together with additional routing cost information for route determination, and packet forwarding.

26 Claims, 7 Drawing Sheets

FOREIGN PATENT DOCUMENTS

| | | |
|---|---|---|
| JP | 2004-282757 | 10/2004 |
| WO | WO 96/19887 | 6/1996 |
| WO | WO 98/56140 | 12/1998 |
| WO | 2004/051939 | 6/2004 |
| WO | 2005/060170 | 6/2005 |

OTHER PUBLICATIONS

X. Zou, B. Ramamurthy, S. Magliveras, "Routing Techniques for Wireless Ad Hoc Networks Classification and Comparison" Proc. of the Sixth World Multiconference on Systemics, Cybernetics, and Informatics—SCI, Jul. 2002.

P. F. Driessen, G. J. Foschini, "On the capacity formula for multiple input-multiple output wireless channels: A geometric interpretation," IEEE Trans. Commun., vol. 47, pp. 173-176, Feb. 1999.

C. L. Hedrick Rutgers, "Cisco—An introduction to IPGR", Aug. 22, 1991.

R. Nelson, L. Kleinrock, "The spatial capacity of a slotted ALOHA multihop packet radio network with capture", IEEE Transactions on Communications, 32, 6, pp. 684-694, 1984.

S. Jain, Y Lv, S. R. Das, "Exploiting Path Diversity in the Link Layer in Wireless Ad Hoc Networks", Technical Report, WINGS Lab, Jul. 2003.

I. Berenguer and X. Wang, "Space-Time Coding and Signal Processing for MIMO Communications—A Primer" Journal of Computer Science and Technology, 18(6), pp. 689-702, Nov. 2003.

European official action, Sep. 28, 2010, in corresponding European Application No. 05 722 190.5.

Translation of Chinese official action, Dec. 15, 2010, in corresponding Chinese Application No. 200580048989.2.

Summary of Japanese Official Action, Apr. 2, 2010, in corresponding Japanese Application No. 2008-500661.

\* cited by examiner

----- NEIGHBOUR CONNECTION
——— PART OF TREE

ROUTE DETERMINATION

——— ROUTING PATH
▬▬ PACKET

PACKET FORWARDING

METHOD AND ARRAGEMENT FOR ADVANCED ROUTING METRICS IN MULTIHOP NETWORKS

This application is the US national phase of international application PCT/SE2005/000339 filed 8 Mar. 2005, which designated the U.S., the entire content of which is hereby incorporated by reference.

TECHNICAL FIELD

The present invention generally relates to routing in communication networks such as multihop networks, and more particularly to the issue of determining appropriate link cost metrics for use in route determination and routing.

BACKGROUND

In general, routing can be defined as the act of moving information from a source. to a destination via one or more intermediate nodes in a communication network.

When routing is applied in a wireless network, such a network is often referred to as a multihop network. In a multihop network, nodes out of reach from each other may benefit from intermediately located nodes that can forward their messages from the source towards the destination. Traditionally, multihop networks have often been associated with so called ad hoc networks where nodes are mostly mobile and no central coordinating infrastructure exists. However, the idea of multihop networking can also be applied when nodes are fixed. In addition, one can also envision central coordination, in particular when nodes are fixed and channels are robust. One may also envision hybrid networks involving wired links in addition to wireless links in multihop networks. A common type of multihop network is based on so called store and forward, where the entire packet is received prior to forwarding.

Routing generally involves two basic tasks: determining suitable routing paths and transporting information through the network. In the context of the routing process, the first of these tasks is normally referred to as route determination and the latter of these tasks is often referred to as packet forwarding.

For route determination, a common approach is to span a so-called routing tree. FIG. 1A illustrates an example of such a routing tree, here rooted at a given destination node. The routing tree is normally calculated based on a shortest path algorithm, implying that the determined shortest paths from the various nodes in the tree to the destination node are so-called "least cost paths". In practice, the tree is continuously built and updated to manage mobility and changing link conditions.

When a particular node in the tree wants to send a packet in the subsequent packet forwarding process, the node is considered a source node, and the packet follows the determined routing path from the source to the destination, as illustrated in FIG. 1B. Different nodes may send packets to the same destination over time, hence different nodes will act as source nodes and send along their respective shortest path. In addition, as multiple destinations may exist, multiple trees may be generated, each rooted at a corresponding destination.

Packet forwarding is normally relatively straightforward, whereas path or route determination can be very complex.

Routing protocols generally use so-called routing metrics as a base for evaluating which path or route that will be the best for a given packet and thereby determining the optimal path to the destination. In the prior art, many different metrics have been used by the routing algorithms to determine the best, or at least a suitable route.

A classical wireline hop metric is unsuitable in a wireless environment, basically since it does not reflect the link quality dependency with respect to distance. Also, transmit power is an important factor in affecting the link quality.

An example of a wireline metric of less use in wireless situations, yet frequently encountered, is a simple hop count metric, where the link cost $\Delta C_{ij}$ from node $v_i$ to $v_j$ is defined as $\Delta C_{ij}=1$.

Another metric that has been suggested in the research literature is based on the physical distance between two nodes, e.g. $\Delta C_{ij} = \text{Distance}_{ij}$.

A better example suited for a radio environment is to use the average link gain $G_{ij}$ and define link cost as the inverse of the average link gain, i.e. $\Delta C_{ij}=G_{ij}^{-1}$. This metric provides large receiver SNR (Signal-to-Noise Ratio) values (with fixed power), and minimum power routes (with power control). This is not a bad metric, but it may lead to a situation where packets will experience long delays (mainly since it does not reflect the capacity of a link appropriately).

Hence an even better link metric example is to use the estimated average link rate and define link cost as the inverse of the average link rate, i.e. $\Delta C_{ij}=1/\bar{r}_{ij}$, assuming rate adaptation capabilities. This metric can be seen in two ways. First, for a fixed sized packet, it strives to offer minimum delay paths (assuming that the queuing delay in the network is negligible). However, in the context of a multihop scheme with a fixed sized data phase (with varying number of packets in a data phase depending on rate adaptation) it offers the least time resource utilization along a path. The average rate based link metric can be estimated by the classical Shannon capacity:

$$\bar{r}_{ij} = B \cdot E\left(\log_2\left(1 + \frac{G_{ij}P_i}{\sigma_N^2}\right)\right), \qquad (1)$$

where B is the bandwidth (may be neglected if only one common bandwidth is used in the whole system), E { ... } is the expectation value, $P_i$ is the transmit power of node $v_i$ (which may be fixed or determined by some other mechanism), $\sigma_N^2$ is the noise level (at node $v_j$). The term, $\sigma_N^2$ could potentially also include average interference, then modeled as complex Gaussian noise, apart from receiver noise.

Using the Shannon capacity for the inverse gain metric case described above, it is seen that it corresponds to minimum power routing with a given target link rate $\bar{r}_{ij}^{(Target)}$. The minimum power is then determined as:

$$P_i = \left(2^{\frac{\bar{r}_{ij}^{(Target)}}{B}} - 1\right)\frac{\sigma_N^2}{G_{ij}} \qquad (2)$$

Reference [1] describes the use of link transmit power as a reasonable cost metric to minimize the cumulative transmit power used over an entire path. This is good for battery consumption and also reduces the interference level in the system, leaving space for new connections and thus allowing operation at higher network load.

As indicated, it is possible to include interference in the metric. Interference-based type of metrics include Least Interference Routing (LIR), where the idea is to use a route that causes the least destructive interference, and Least Resistance Routing (LRR), where the idea is to use the route encountering the least interference.

It is also possible to include traffic load in the metric. However, including such traffic aspects in the metric (e.g. incorporating aspects of traffic load and medium access rules) is not straightforward, as one then also needs to consider stability issues.

It is evident that the routing metric has a substantial effect on route determination, and therefore it is of significant importance to provide enhanced metrics for determining suitable routes. Improved route selection then naturally leads to improved routing with higher throughput and reduced delay in the networks.

SUMMARY

The technology described herein overcomes these and other drawbacks of the prior art arrangements.

It is a general object to provide improved routing in fully wireless or at least partially wireless multihop networks. In particular, it is desirable to provide higher throughput and reduced delay in such networks, or to allow operation at higher network load.

It is an object to provide improved route selection or route determination by use of enhanced routing metrics.

It is a specific object to provide an improved method and arrangement for determining link cost for routing in an at least partially wireless multihop network.

It is also a specific object to provide a method and arrangement for route determination based on enhanced link cost determination in such a network.

Another specific object is to provide a method and arrangement for routing based on enhanced link cost determination.

The inventors envisioned a multihop network scenario in which nodes are equipped with advanced multi-antenna arrangements, and especially a scenario with a diverse flora of relaying nodes and end-user terminals equipped with different antenna arrangements. The inventors recognized the advantage of exploring the presence of such advanced antenna arrangements in multihop network nodes not only for providing high capacity over fading channels but also for the purpose of determining link cost for route determination or routing in the network. Link cost is determined for a wireless link between a pair of nodes in the network based on multi-channel characteristics between the nodes, where at least one of the nodes is configured for operation with multiple antennas to provide for multiple channels.

Link cost is preferably determined based on the number of transmit antennas and receive antennas, respectively, thus effectively providing a multi-antenna enabled routing metric. In this way, the technology described herein smoothly integrates the use of different dimensionality of multiple-antenna channels, handling of various multiple-antenna channel properties, and support for various multiple-antenna communication schemes. The benefits of this may differ from case to case, but can primarily be attributed to diversity, spatial multiplexing, or beamforming gain (the latter a.k.a. coherent or directivity gain). More specifically, the technology described herein allows for, and utilizes, the increased channel dimensionality offered by schemes based on MIMO, MISO, and/or SIMO channels, possibly together with traditional SISO schemes for determining link cost in one and the same multihop network.

For example, link cost may be determined as a function of an N×M dimensional channel matrix, where N and M are the number of antennas at the transmitting node and the receiving node, respectively. The numbers N and M, corresponding to the number of antennas, effectively span up the channel matrix or vector. Alternatively, a heuristic measure can be used based more directly on the values of N and M.

Preferably, link cost is determined also based on knowledge of the multiple-antenna communication scheme used between the nodes. This may for example be accomplished by determining link cost according to a function that is dependent on the particular multiple-antenna communication scheme such as traditional adaptive beamforming (BF) or spatial multiplexing based MIMO. In this way, the link metric not only reflects the number of antennas but also which antenna configuration or scheme that is used, thus catering for arbitrary number of antennas at both the transmitter side and the receiver side as well as for different advanced antenna schemes. If several multiple-antenna communication schemes are supported between two nodes, a selection of scheme can be made to optimize the performance metric used for route determination. Furthermore, different schemes may be adopted for different links depending on the channel characteristics and the node capability.

The routing metric may e.g. be of the form delay (i.e. rate-dependent), energy or power dimension. For example, link cost may be determined as the inverse of the average link rate, where average link rate may be calculated based on an expectation value of a channel matrix for a given transmit power, or based at least partly on the number of used transmit antennas and receive antennas and transmit power. In another example, link cost is determined as minimum transmit power for a fixed link rate per hop, where minimum transmit power is determined based on the channel matrix, or based at least partly on the number of used transmit antennas and receive antennas and the fixed link rate.

Based on this new type of multi-antenna enabled link cost, route determination is performed to select a good or optimal path, and then packet data is forwarded from a given node to at least a neighbor node on the path to a given destination node in accordance with the route determination.

In practice, route determination is performed based on link cost information for a number of wireless links and/or wired links in the at least partially wireless multihop network. The novel link cost determination based on multi-channel characteristics of the invention is employed for determining link cost for at least part of the wireless links in the network. In a hybrid multihop network with both wireless and wired links, routing costs for the end-to-end point of view are normally determined considering the characteristics of both the wireless and wired parts. This means that link cost for wired links have to be determined according to some metric, or simply set to some constant values or even zero values, depending on the application. It should also be understood that link cost for some of the wireless links may be determined using other methods, as long as link cost for at least one wireless link is determined according to the invention.

The technology offers the following example advantages:

Link cost metric with inherent support for arbitrary number of antennas at both the transmitter side and the receiver side as well as for different advanced antenna schemes.

Smooth integration of multiple antenna schemes together with traditional SISO schemes for determining link cost.

Optimal route selection.

Higher throughput and reduced delay, power and/or energy consumption in the network.

Support for correlated/uncorrelated channels.

Support for full rank/degenerated rank channels.

Generally applicable to any routing protocol.

Other advantages will be appreciated when reading the below description of non-limiting example embodiments.

BRIEF DESCRIPTION OF THE DRAWINGS

The technology described herein, together with further objects and advantages thereof, will be best understood by reference to the following description taken together with the accompanying drawings, in which.

DETAILED DESCRIPTION

Figure 1A:
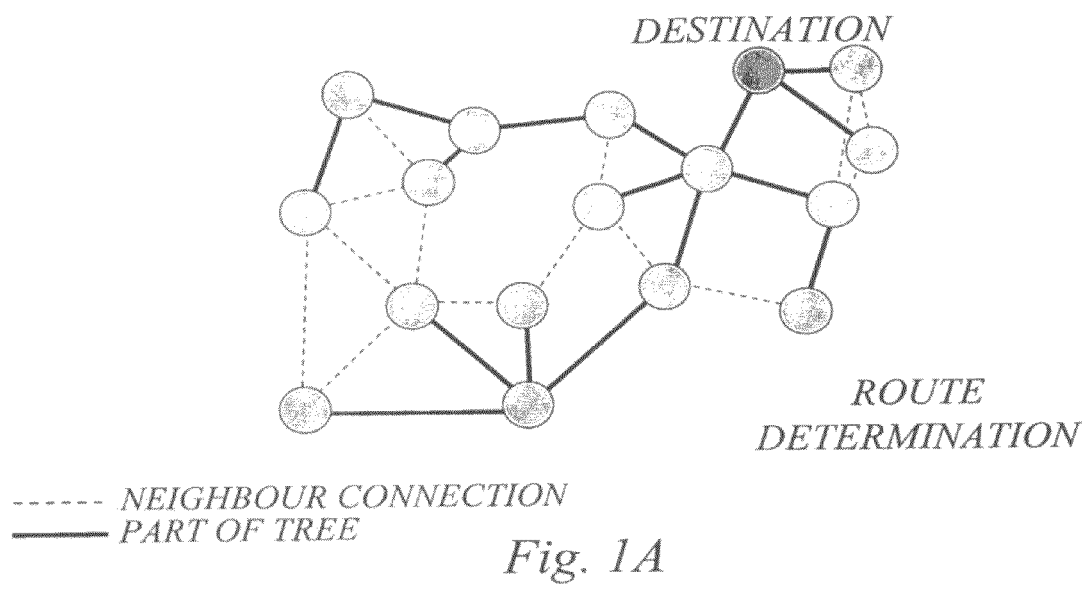
FIG. 1A is a schematic diagram illustrating an example of a traditional routing tree generated during route determination.
Figure 1B:
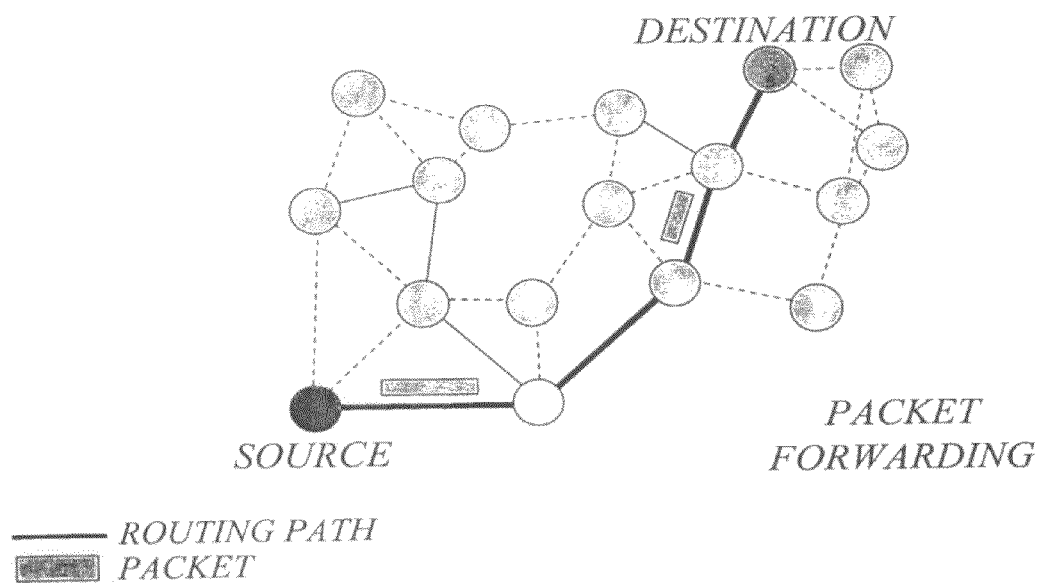
FIG. 1B is a schematic diagram illustrating packet forwarding between a source node and a destination node.

Throughout the drawings, the same reference characters will be used for corresponding or similar elements.

Introduction

The technology described herein is generally applicable to any routing protocol, independent of implementation, including both distributed and centralized routing algorithms, hop-by-hop routing as well as source-routing, link-state routing and distance-vector routing (also sometimes referred to as Bellman-Ford algorithm based), proactive or reactive routing, flat or hierarchical routing, single path and multipath routing, as well as variations and combinations thereof.

For more information on routing techniques, especially in wireless ad hoc networks, reference can be made to [2].

In source-routing it is normally assumed that the source end node determines the entire route. The intermediate nodes then merely act as store-and-forward units, mindlessly forwarding the packet to the next node on the path to the destination node.

In hop-by-hop routing, each node basically determines and maintains a routing table with information, for each of a number of destinations, of a preferred next hop node. When a node receives a packet, it forwards the packet to the next hop node on the basis of information on the destination of the packet. The forwarding process continues from node to node until the packet reaches the destination.

The network nodes pass routing information and maintain their routing tables through the transfer of various routing information messages. The routing information naturally varies depending on the particular routing scheme used.

Hop-by-hop routing schemes are normally categorized into two main classes, namely link-state and distance-vector algorithms. Link-state algorithms generally flood routing information to all nodes (however solutions flooding only part of the network also exist), but each node then only sends information describing the state of its own links. Distance vector algorithms on the other hand are based on exchanging routing cost information only between neighboring nodes.

The manner in which the routing tables are determined and updated may differ from one routing scheme to another. However, a common objective is normally to find the path that is optimal in some sense, as mentioned in the background section.

For a better understanding a brief overview is given of a non-limiting example of a commonly used type of routing algorithm.

A classical approach is to span a so-called shortest path multihop tree between a source node and a destination node, where each link is characterized by a delta cost, and each node is assigned an accumulated cost to reach the destination along the determined shortest path. It should be clear that the expression "shortest path" normally corresponds to a minimum cost path, which emphasizes that the path or route is a path that offers the minimum cost with respect to some particular cost metric.

The Bellman-Ford shortest path algorithm will be used as an example of a shortest path algorithm in the following, although the Dijkstra algorithm, or any other routing algorithm for that matter, could be used as well. The Bellman-Ford algorithm has played a central role in wired networks such as the Internet, but also has an important function in wireless multihop networks. In a commonly preferred implementation, the Bellman-Ford algorithm provides shortest path determination in a distributed and "uncoordinated" fashion and guarantees convergence within a finite time period based on the exchange of routing cost information between neighboring nodes.

For the Bellman Ford algorithm, the cost $C_i$ of a node $v_i$ for each destination d of a given set of destinations may thus be determined through the distributed Bellman Ford equation:

$$C_i^{(d)} = \min_{\forall j \in N_i} \{\Delta C_{ij} + C_j^{(d)}\}, \quad (3)$$

where $v_j \in N_i$ is the neighbor index of neighbor nodes belonging to node $v_i$, $C_j$ is the cost for neighbor $v_j$ to reach destination d, and $\Delta C_{ij}$ is the cost to go from node $v_i$ to $v_j$ (i.e. the cost for a hop, or the link cost).

The number of iterations may be limited to an integer number, thereby upper limiting the number of hops, e.g. a maximum of two hops.

As mentioned above, the Bellman-Ford algorithm is easily implemented in a distributed manner. A multihop tree between source and destination in a multihop network is built and defined based on routing cost information distributed in the network. In practice, neighboring nodes exchange routing lists. Each routing list contains multiple entries, where each entry specifies a destination node, the routing cost from the node in question to the destination as well as an indication of a next hop node. The routing list is typically sent in a packet, sometimes denoted as a Hello packet.

A node receiving a routing list, checks whether any entry offers a more optimum route than what the nodes own list indicates. Often, timestamps or sequence numbers are included together in the entry to ensure that the new cost information is not outdated state information.

To reduce the overhead of a distributed approach, it is also common practice to restrict routing cost information from propagating all over the network. E.g. a maximum number of hops, only nodes within a certain region, or only nodes under the control of one Base Station (BS) may be allowed.

Basic Concepts

Figure 2:
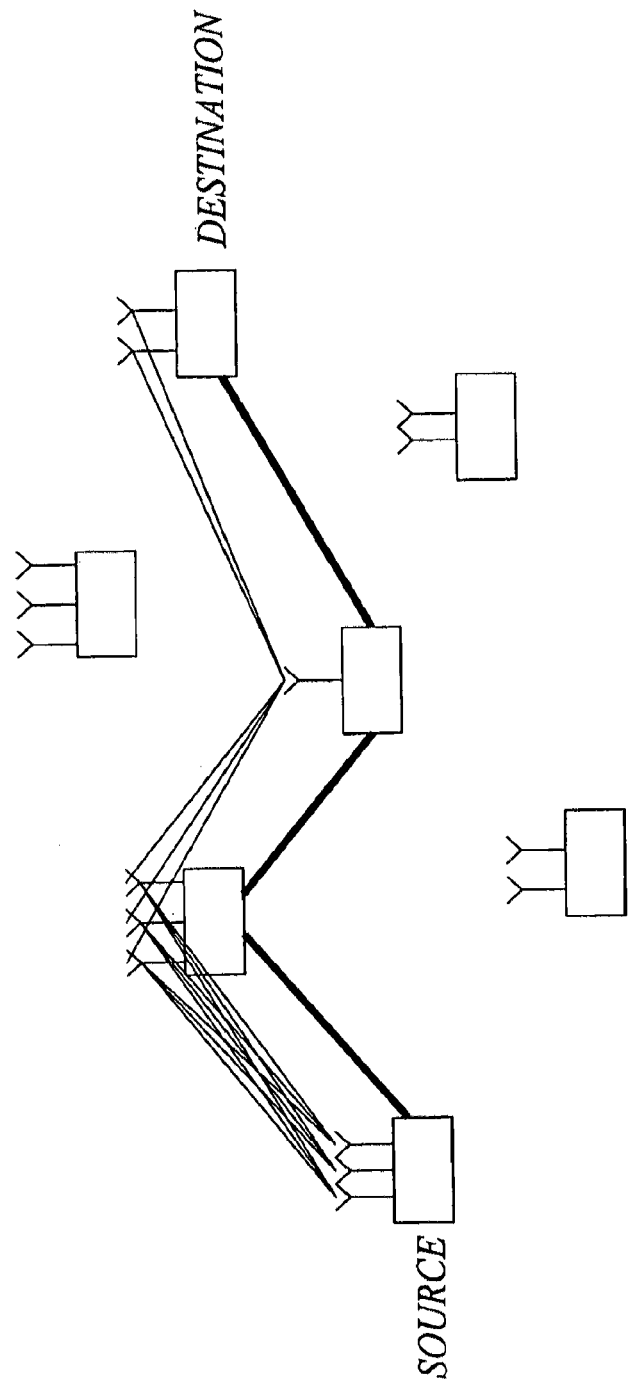
FIG. 2 is a schematic diagram illustrating an example of a fully wireless multihop network with a mix of nodes with various antenna arrangements.
Figure 3:
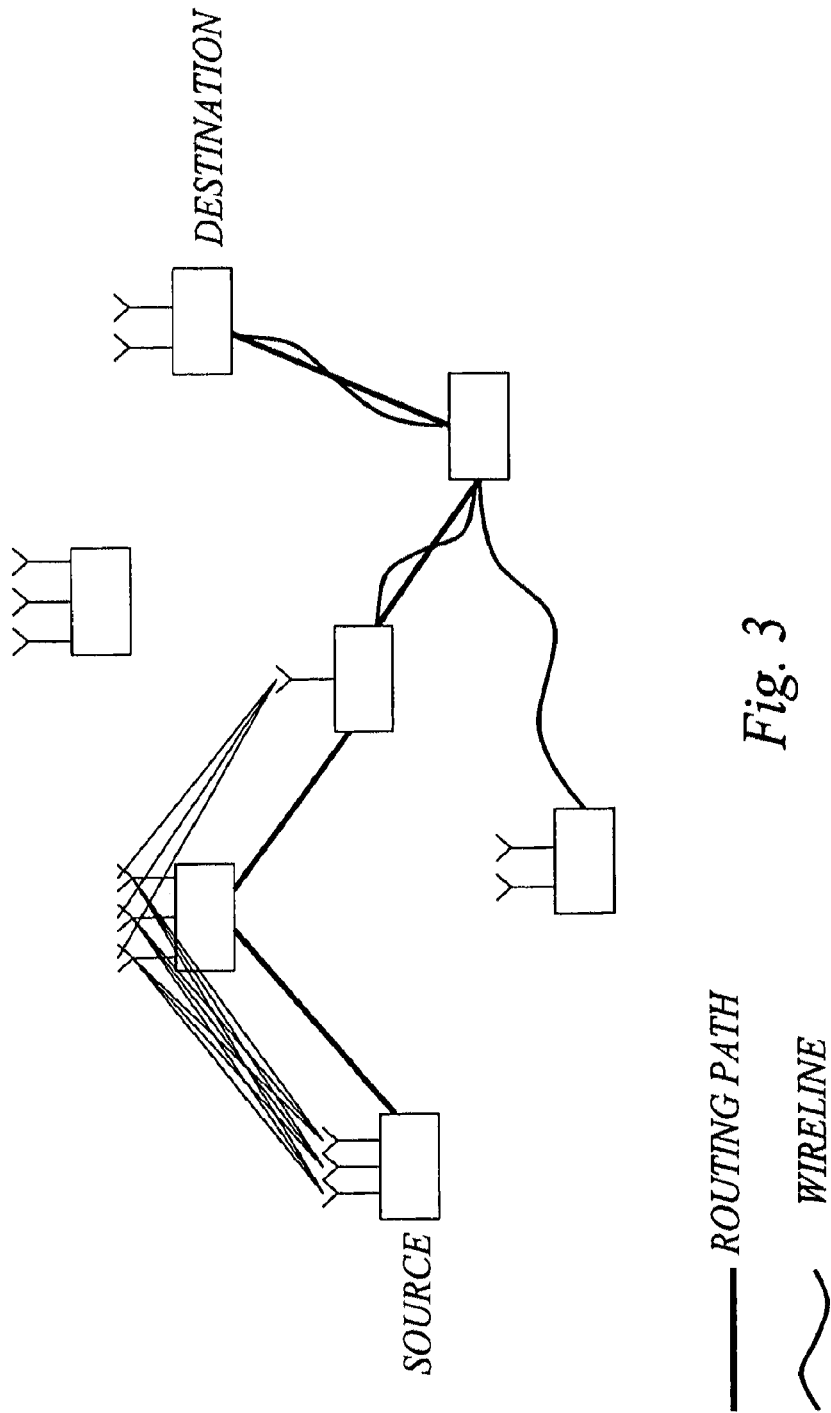
FIG. 3 is a schematic diagram illustrating an example of a partially wireless multihop network with a mix of nodes with various antenna arrangements.

The inventors envisioned a multihop network scenario in which nodes are equipped with advanced multi-antenna arrangements, and especially a scenario with a diverse flora of relaying nodes and end-user terminals equipped with different antenna arrangements. FIG. 2 illustrates an example of a fully wireless multihop network with a mix of nodes with various antenna arrangements. Nodes may have different number of antennas and different spacing between antennas, and may use different multi-antenna communication schemes such as traditional adaptive beamforming and spatially multiplexing MIMO (Multiple Input Multiple Output), MISO (Multiple Input Single Output), SIMO (Single Input Multiple Output), and of course traditional SISO (Single Input Single Output) communication. FIG. 3 illustrates a corresponding example, but with wired links between some of the nodes, thus forming a partially wireless multihop network with wired links as well as various advanced antenna arrangements for wireless communication. Of course, the technology described herein is also applicable to more homogenous cases of multi-antenna arrangements, such as an adaptive beamforming network or a MIMO network.

In this context, the inventors recognized the advantage of exploring the presence of advanced antenna arrangements in multihop networks not only for providing high capacity over fading channels but also for the purpose of determining link cost for route determination or routing in the network. Link cost is determined for a wireless link between a pair of nodes in the network based on multi-channel characteristics between the nodes, where at least one of the nodes is configured for operation with multiple antennas to provide for multiple channels.

Advanced antenna solutions such as adaptive antenna systems and MIMO (Multiple-Input Multiple-Output) systems can be used to enhance system capacity performance by using multiple transmit and/or receive antennas. For example, a classical MIMO system is normally based on a transmitting node with multiple (N) transmit antennas and a receiving node with multiple (M) receive antennas. In matrix form, the corresponding multi-channel model can be expressed as:

$$y = Hx + w, \quad (4)$$

where y is the received signal vector, H is a M by N complex channel matrix, x is the transmitted signal vector, w is a M by 1 complex white noise vector. The model is valid for a link, but can be extended to include potential interfering sources. Nevertheless, in a first approximation, in the event of potential interfering sources, those can be included in the vector w in addition to the noise. The complex channel gain matrix H can be written as:

$$H = \begin{bmatrix} h_{11} & \cdots & h_{1N} \\ \vdots & \ddots & \vdots \\ h_{M1} & \cdots & h_{MN} \end{bmatrix} \quad (5)$$

where $h_{ij}$ is a complex representation of the channel between transmit antenna j in the transmitting node and receive antenna i in the receiving node.

The multi-channel characteristics between the transmitting node and the receiving node can thus be represented by for example the number N of transmit antennas and the number M of receive antennas, which together define the dimensions (N, M) of the channel matrix. Another option is to consider the actual complex channel gain matrix H in the determination of link cost for route determination. With these examples, the multi-channel characteristics basically correspond to channel matrix characteristics, including information on the dimensions of the matrix and/or more detailed information on the content of the channel matrix, including also eigenvalue representations of the channel matrix.

In order to provide for multi-channel behavior, at least one of N and M must be greater than 1, thus supporting MIMO (Multiple Input Multiple Output), MISO (Multiple Input Single Output), SIMO (Single Input Multiple Output).

Often, the term MIMO is used in two different ways, to refer to a matrix property of a channel, and a communication method. Here however, MIMO, MISO, SIMO, and SISO normally refer to the channel as such, not to how it is exploited. Given a channel element in a MIMO, MISO, or SIMO channel, one may then consider its basic properties, e.g. whether the element is static or variable. In general, we are often concerned with variable channels due to the mobility of communicating nodes. Given the variability, it is often suitable to model it as a stochastic variable. An interesting aspect is the characteristics of a MIMO, MISO, or SIMO channel, i.e. whether the channel elements are correlated, uncorrelated or something in-between. A multitude of multiple antenna schemes operating on single links are well known in the art. They often differ with respect to whether full or partial knowledge of the channel elements (and possibly the interference) at the receiver is known, and whether it is known at both the transmitter and receiver, or just the receiver. The multiple antenna communication methods that have been developed consider this knowledge in conjunction with knowledge of whether the channel is of MIMO, MISO or SIMO type.

The list below should be seen as examples of well-known advanced antenna communication schemes, and is hence not exhaustive. For details on each scheme, relevant and current advanced antenna research literature should be considered, see e.g. [11].

| Channel type | Scheme | Preferred channel element characteristics | Type of Feedback | Adapted characteristic | Comments |
| --- | --- | --- | --- | --- | --- |
| MISO | Alamouti diversity | Fading Uncorrelated | None | None | STC encoding at TX STC decoding at RX |
| | Delay Diversity | Fading Uncorrelated | None | None | Delay Div. encoding at TX |
| | Adaptive BF with feedback | Fading Uncorrelated | CSI | TX antenna complex weights | |
| | (Semi-) traditional adaptive BF with feedback | Fading Correlated | Channel phase vector | TX antenna phase weights | Channel phase vector is known. Forming of a coherent wave-front. |

-continued

| Channel type | Scheme | Preferred channel element characteristics | Type of Feedback | Adapted characteristic | Comments |
|---|---|---|---|---|---|
| | Traditional adaptive BF | No fading Correlated | "Direction" | TX antenna phase weights | Array signature knowledge is exploited. Forming of a coherent wave-front. |
| SIMO | Maximum ratio combining | Fading Uncorrelated | None | RX antenna complex weights | |
| | Interference rejection combining | Fading Uncorrelated | None | RX antenna complex weights | Maximize SINR, i.e. suppress interference. |
| MIMO | SVD based MIMO | Fading Uncorrelated | CSI | TX and RX antenna complex weights | Spatial multiplexing gain |
| | Zero-forcing dirty paper QR-Decomposition based MIMO | Fading Uncorrelated | CSI | TX and RX antenna complex weights | Spatial multiplexing gain. Exploits non-linear encoding at TX. |
| | BLAST | Fading Uncorrelated | Rate | RX antenna complex weights | Spatial multiplexing gain. Uses successive interference cancellation in RX. |
| | Space Time Coded based MIMO | Fading Uncorrelated | None | None | Diversity gain (Alamouti diversity is a special case of this) |

Note that to some extent one may say that in many spatial multiplexing techniques, one also has a form of beamforming, though with multiple beams and often varying rapidly based on the instantaneous realization of H. This type of beamforming differ from a traditional type of adaptive beamforming in that the array signature is generally not explicitly known, instead the channel H is often known. In addition, in traditional adaptive beamforming, the antenna elements are generally positioned close to each other (less than the coherence distance), such that the channel elements are fully correlated. There is however also an evolved type of traditional adaptive beamforming, wherein the channels are assumed fully correlated (due to placement of the antenna elements within the coherence distance) and the channel between the transmitter and receiver is made known to the transmitter. This channel knowledge is then used for pointing a beam in a desired direction. As stated earlier, depending on scheme and channel properties, several different gains can be achieved.

Flow Schematics

Figure 4:
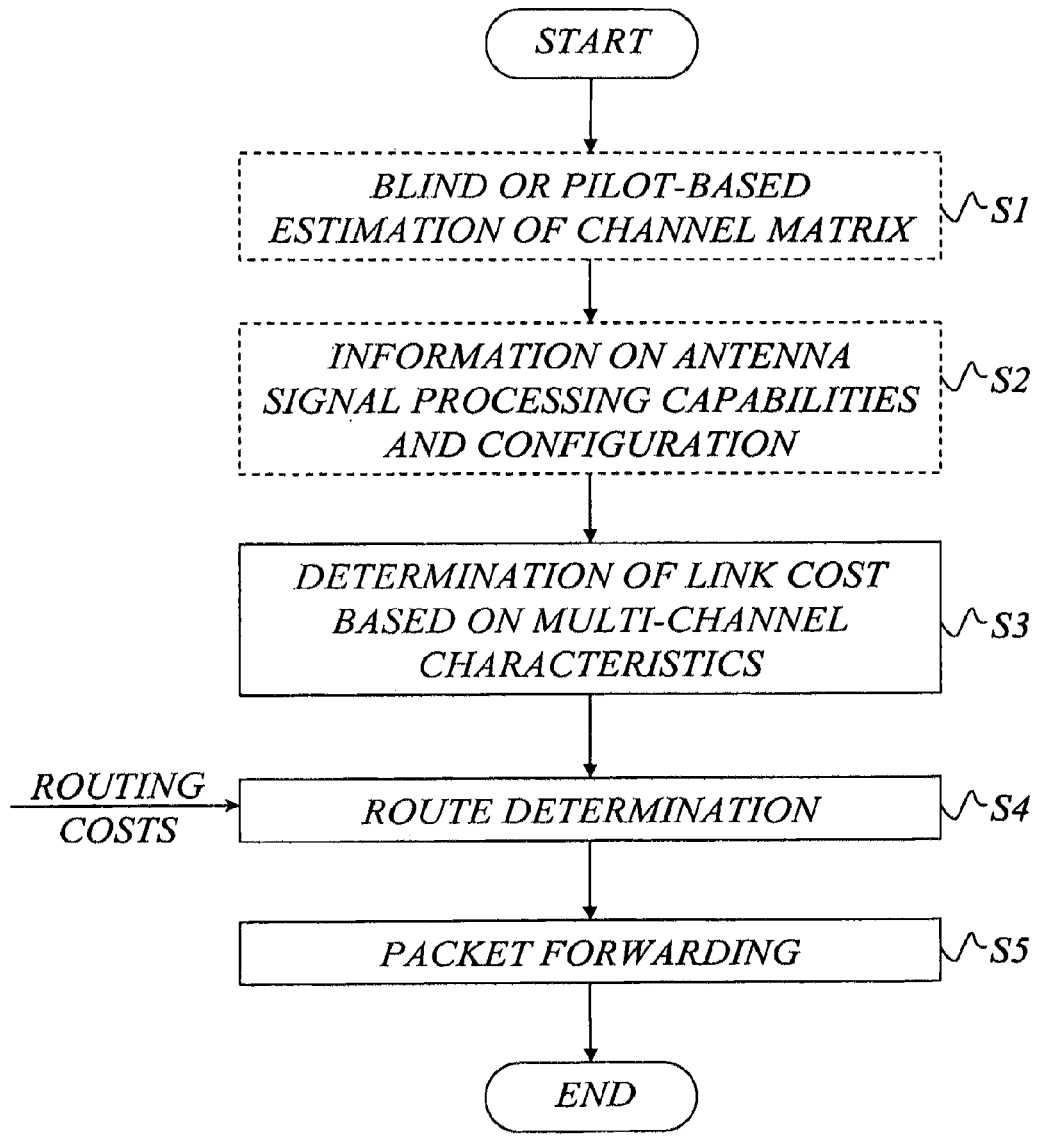
FIG. 4 is a schematic flow diagram of a method of routing data including link cost determination and route determination according to a preferred but example embodiment.

FIG. 4 shows a schematic flow diagram of a method for routing data, including dissemination of routing cost information, route determination, packet forwarding, as well as link cost determination. As indicated above, the technology described herein relies on determining link cost, for each of number of links in. a considered multihop network, based on multi-channel characteristics of the respective link.

This multi-channel characteristics may for example be determined based on explicit channel matrix estimation (as indicated in the optional step S1) and/or (as indicated in the optional step S2) the number of transmit and receive antennas or other information on the antenna system processing capabilities of the involved nodes such as which multi-antenna communication scheme that is used. The channel matrix estimation of step S1 may be blind or based on pilot transmissions.

Once some form of multi-channel characteristics has been determined, link cost is calculated according to a predetermined link cost function based on the multi-channel characteristics (step S3). The link cost function may also depend on the multi-antenna communication scheme (traditional adaptive BF, spatial multiplexing based MIMO, space time coding based MIMO and so forth) to be used between the nodes. If several multi-antenna communication schemes are supported, a selection of scheme can then be made to optimize the performance metric used for route determination.

If wired links are present in the considered multihop network, corresponding link costs may be determined according to some predetermined metric or given as constant values, or even set to zero.

It is also possible to determine the link cost for some of the wireless links using other methods, as long as link cost for at least one wireless link is determined according to the invention.

The determined link cost information is subsequently used together with additional routing cost information (which may vary depending on the used route determination protocol) for route determination (step S4), thereby determining optimal, or at least appropriate, paths for routing information between different network nodes in the network.

In the forwarding process (step S5), packets are forwarded from source to destination via a set of suitable intermediate nodes along a path determined during the route determination. In this forwarding process, it is recommendable to use the selected multi-antenna communication scheme with up-to-date channel knowledge of transmit parameters such as antenna weights.

The technology described herein takes advanced antenna schemes into consideration when performing route determination in a multihop network, and thus, allows enhanced utilization of and benefit from advanced antenna schemes in a multihop network. It does so by introducing new advanced antenna enabled routing metrics as well as signaling and operation mechanisms.

A link metric reflects the number of antennas and/or which antenna array configuration channels (MIMO, MISO, SIMO, SISO). Moreover, those antenna array configuration channels can, depending on channel characteristics, exploit different effects to enhance-communication performance. Those effects may offer beamforming gain, diversity gains, and spatial multiplexing gain or combinations thereof. Different methods exist depending on the antenna array configuration channels and different channel characteristics.

Illustrative Examples of Link Cost Determination

In the following, the technology is described with reference to illustrative non-limiting examples of how to determine link cost.

The link cost may be a function of the number N, M of transmit and receive antennas:

$$\Delta C_{ij} = f(N, M) \qquad (6)$$

The link cost may alternatively be a function of at least the M times N channel matrix, H, (or a representation thereof) between two nodes, where N and M are the number of TX and RX antennas. The link cost then can simply be written as:

$$\Delta C_{ij} = f(H) \qquad (7)$$

The link cost may preferably also use additional parameters; such as the expected (SISO) signal to noise ratio (or signal to noise plus interference ratio) $\rho$, a desired fixed link rate. The metric may be of the form delay (i.e. rate dependent), energy or power dimension.

Non-limiting Metric Examples

First, we will exploit a MIMO single link capacity relation (see reference [3]) for the purpose of a routing metric and then we will look at other forms of the metric that have the common denominator that it takes into account the form and characteristics of the channel matrix, H. An assumption in this exemplary embodiment is that spatial multiplexed MIMO is supported in all nodes. The spatial multiplexed MIMO may for instance be based on a so-called Singular Value Decomposition (SVD) MIMO approach, i.e. performing SVD of the channel matrix H. The result from an SVD operation is that the channel matrix H may be decomposed into three matrices according to H=USV.sup.H, where U and V are unitary matrices, and S a diagonal matrix with the singular values on its diagonal. In SVD-based MIMO, the sender first multiply the vector x with V, and the receiver multiply the received signal y with U.sup.H. Effectively, transmission will occur over orthogonal channels with a gain given by the singular values in S. The benefit of this approach is that it handles arbitrary channel dimensions and channel characteristics.

The channel matrix may be determined by explicit channel estimation according to well-accepted computational methods such as those based on Minimum Mean Squared Error (MMSE) or Maximum Likelihood calculations. The channel matrix estimation is typically based on pilot transmissions, although so-called blind channel estimation is also possible.

Rate with given (fixed) power $P_i$: On average, the rate for a link from node $v_i$ to $v_j$ is determined based mainly on the expectation value of the channel matrix $H_{ij}$ of dimension (N, M), defined between node $v_i$ and node $v_j$ according to:

$$\bar{r}_{ij} = B \cdot E\left(\log_2\left(\text{Det}\left(I_i + \frac{P_i}{N \cdot \sigma_N^2} \cdot H_{ij} \cdot H_{ij}^H\right)\right)\right), \qquad (8)$$

where B is the bandwidth (may be neglected if only one common bandwidth (BW) is used in the whole system), E{...} is the expectation value, Det{...} is the determinant, $I_i$ is the identity matrix of dimension M by M, $P_i$ is the transmit power of node $v_i$ (which may be fixed or determined by some other mechanism), $\sigma_N^2$ is the noise level (at node $v_j$), and H is the Hermitian operator. As previously stated, the term, $\sigma_N^2$ could potentially also include average interference, apart from receiver noise.

The link cost is then defined based on the inverse of the average rate, for example:

$$\Delta C_{ij} = 1/\bar{r}_{ij}. \qquad (9)$$

In principle, the metric above could also be computed by assuming that power constrained waterfilling of the eigenchannels are performed in order to maximize the channel capacity. However, at high SNR the difference with equal power distribution over the eigenchannels is negligible.

It also often turns out that the instantaneous channel capacity is a reasonably good metric, i.e. the expectation value does not need to be determined, when the dimension of $H_{ij}$ is reasonably large.

By using this (new) measure, nodes with different antenna configurations, i.e. arbitrary numbers of antennas and arbitrary situation with correlated/non-correlated channels from the antennas can be managed (e.g. spatial multiplexed based MIMO, MISO/SIMO with uncorrelated channels and BF, and traditional adaptive BF are inherently supported).

Simplifications to determine the metric can be used if the channel statistics is known. For instance, if the MIMO channels are (known to be) uncorrelated, a heuristic measure could be:

$$\bar{r}_{ij}(MIMO) = B \cdot \min(N, M) \cdot \log_2\left(1 + \frac{P_i}{\sigma_N^2} \cdot \frac{\max(N, M)}{N}\right), \qquad (10)$$

where N and M are the number of used transmit and receive antennas respectively. A more exact heuristic metric could also be envisioned, e.g. including determination of the actual channel rank (rather than the upper limit as assumed herewith the max (N,M) argument).

For traditional adaptive beamforming (operating in the non-EIRP (Effective Isotropic Radiated Power) limited range) a corresponding measure could be defined as:

$$\bar{r}_{ij}(BF) = B \cdot \log_2\left(1 + \frac{P_i}{\sigma_N^2} \cdot N \cdot M\right), \qquad (11)$$

The number of antenna elements could be announced in a regular Hello message (together with the routing cost message).

Power with given (fixed) Rate $R_i$: Another cost metric could be the minimum power route for a fixed (or desired) rate per hop. As seen in (8), it is not straightforward how to solve for the power. This may however be formulated through solving for the power as the link cost according to:

$$P_{ij}^{(min)} = \min_{\bar{r}_{ij} = \bar{r}_{ij}^{(Target)}} \{P_i\}, \qquad (12)$$

where the rate in (8) is equal to a given rate target $\bar{r}_{ij}^{(Target)}$, and (8) is solved for the power $P_i$. The chosen metric in (12) is then used together with a shortest path routing algorithm. The link cost is then defined as the power per hop:

$$\Delta C_{ij} = P_{ij}^{(min)} \qquad (13)$$

Under the simplifying assumption used in (10), the power can be explicitly solved for and determined through:

$$P_i = \left(2^{\frac{r_{ij}^{(Target)}(MIMO)}{B \cdot \min(N,M)}} - 1\right) \cdot \frac{\sigma_N^2 N}{\max(N, M)}. \quad (14)$$

Furthermore, the technology offers solutions to handle channels of different rank. The characteristics of a channel matrix or channel vector can be different depending on the type of reflections that occur. For example, a matrix channel H can be orthogonalized with a singular value decomposition (SVD). If the SVD results in only one significant singular value (and the others are substantially zero), then the channel is said to be degenerated, as rows in H are essentially identical. The channel matrix then has a rank equal to one. This channel is suitable to use for traditional adaptive beamforming since only one beam can be sent and received. Typically, antennas in the arrays are placed fairly close, and there is essentially one signal path. However, if multiple significant singular values result, the channel will not be degenerated and can be used to send multiple parallel substantially non-interfering data streams (the channels are often denoted MIMO-sub channels or eigenchannels). Typically, a so-called scatter environment is experienced when this happens, or multiple signal paths will exist between the sender and receiver arrays. The invention, in particular when using the determinant relation together with waterfilling of eigenchannels, is able to handle both degenerated and non-degenerated channels, i.e. a single beam is assumed when it is optimal and spatially multiplexing MIMO with multiple beams is assumed when it is optimal. Moreover, the statistics of the channel matrix may differ depending on reflection conditions. If the covariance matrix is determined for H, i.e. R.sub.HH=E{HH.sup.H}, and the covariance matrix is a diagonal or simply an identity matrix, then the channels are uncorrelated. However if the covariance matrix is not an identity matrix, one may talk about correlated channels. The technology described herein, especially when using the determinant relation, is able to handle both correlated and uncorrelated channels. More precisely, if the channels are fully correlated, then the channel has rank one and only one beam may be utilized.

While the embodiments above have been able to select the optimum communication scheme under the assumption that full channel state information (CSI) is available, i.e. H, is known at both the sender and the receiver, in practice one may only have limited information at the transmitter, such as the covariance matrix $R_{HH}$, the average path gain, or no information at all. In this situation, other suboptimum communication schemes may have to be used instead. For instance, if a diversity achieving Space Time Code is used, the details of the metric changes, e.g. the average (inverse) rate/throughput, or average power, to achieve a certain communication quality (such as a predetermined average probability level of correct reception).

Other Cost Related Aspects

Similar to minimum power routing above, minimum energy routing could also be performed. One then considers an energy metric per hop which is minimized while accounting for the matrix or vector characteristics of the channel.

Apart from link related costs, it is not excluded that more advanced cost metrics is developed, where each node may add a cost factor depending on e.g. queuing delay (in particular useful with the inverse rate metric) and other parameters of some importance. The parameters could also be node (or area) dependent to cope with asymmetries.

Operation in Cellular Systems

Although particularly suitable for ad hoc networks, the technology described herein is also applicable to e.g. multihopping in a cellular system. Operating multihop networks in a cellular system has different characteristics compared to traditional routing in ad hoc networks. First of all it is noted that traffic typically flows to and from access points. Secondly, it is noted that the access point may have more power to transmit with. This asymmetry reflects itself in that the cost should take those aspects into account. Using the node dependent power setting in the link cost metric as in (8) ensures handling of the asymmetries to some extent.

Figure 5:
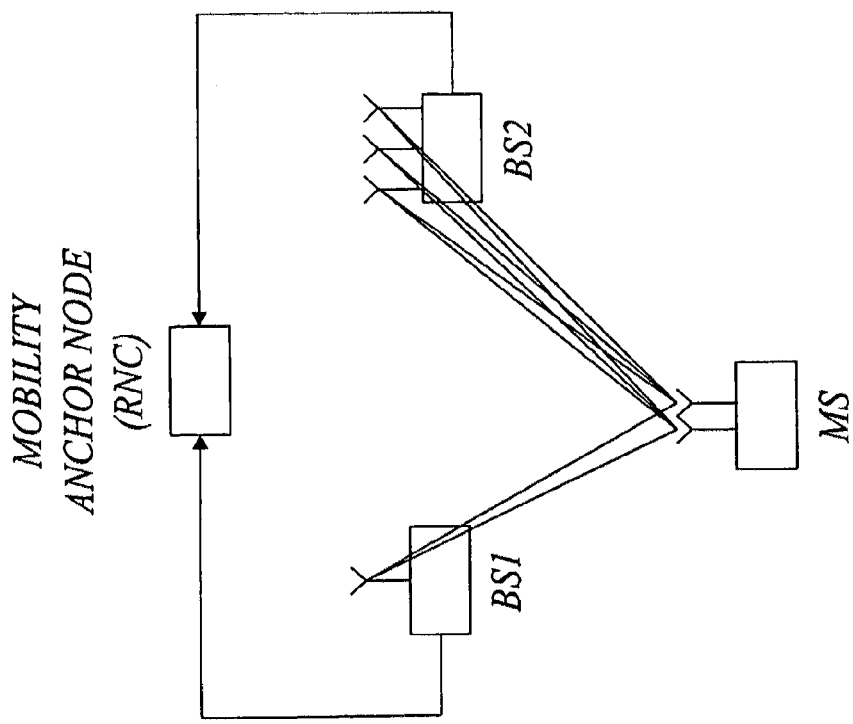
FIG. 5 is a schematic diagram illustrating an example of path selection including handover in a base station scenario.

FIG. 5 illustrates an example of path selection including handover in a base station scenario in a cellular communication system. The simplified exemplary system illustrated in FIG. 5 includes a mobile station (MS) capable of communicating with two base stations (BS). The base stations are connected to a mobility anchor point such as a radio network controller (RNC) or similar network node. It is assumed that at least one of the involved nodes has a multi-antenna arrangement for wireless multi-channel communication. The cost for each MS-BS link is determined based on multi-channel characteristics between the mobile station and the respective base station. Preferably, the link cost for the usually wired links between base station and mobility anchor node is determined based on link rate or by assigning a fixed, constant link cost C. In the example of FIG. 5, the path selection from the mobile station to the mobility anchor point translates into a selection between the two multihop paths MS-BS1-RNC and MS-BS2-RNC. Normally, the path with the least accumulated cost is selected. In some sense, the path selection in such a cellular network may thus involve a handover procedure between the base stations. In other words, the handover is based on the multi-channel characteristics between the mobile station and the respective base station, assigning a respective cost for each MS-BS link as indicated above and selecting an appropriate base station to use for the mobile communication based on the determined accumulated link costs along the respective path. In addition, other traditional handover criteria may also be considered such as the load/residual free resources, power resources etc. at the base station. Moreover, hysteresis mechanisms to avoid the so-called ping-pong effect, i.e. rapid and too sensitive switching back and forth, may also be included. The hysteresis mechanism and other criteria could of course also be used in the more general multihop case.

The expression "routing" should thus be interpreted in a general sense in the context of a general "multihop network" that involves at least two hops, at least one of which is a wireless hop.

Implementation Aspects

In the following an illustrative example of possible signaling and operation mechanisms for determining routing costs in a multihop network, supporting different advanced antenna schemes, will be described. The example below is directed towards distributed operation and proactive routing[1].

[1]Routes are calculated continuously and independently of traffic activity.

Normally, each node in the network announces, in regular intervals, capabilities of the node. This is typical for ad hoc networks and may be included in what is often called Beacons or Hello messages. The information that may be transmitted according to this example of technology described herein includes:

Advanced antenna signal processing capability. For instance, information on whether the node is spatial multiplexing MIMO-, Space Time Code-, or receive diversity-, enabled.

Routing cost information is announced.

If the link cost determination is based on channel matrix estimation, multiple pilots allowing characterization of matrix or vector channels may advantageously be sent. This does not have to take place at the same time as the Beacon message is sent.

Alternatively, or as a complement, information on the number of antennas may be transmitted.

Potentially other characteristics of the array may also be transmitted. For instance, indication if the antenna elements are tightly or widely spaced (essentially saying if they are intended for spatially multiplexing based MIMO or for traditional adaptive beamforming), or even if multiple polarizations are used as well as circular or linear polarized.

Optionally also the interference characterized at the Beacon/Hello message sending station may be sent to other nodes.

The node receiving information from Beacons/Hello messages:

If channel matrix estimation is enabled, the node receives one or more pilots on its one or more antenna branches. The node then performs channel estimation to determine the matrix or vector channels (even SISO channels when that occur).

The node computes link metric and determine routing costs based on channel matrix estimation and/or information on the number of antennas and potentially also based on other characteristics of the antenna array(s), such as supported antenna array communication schemes.

Potentially also the interference characterized at the Beacon/Hello message sending station may be utilized at the link cost determination.

The node performs route determination.

The node performs packet forwarding in accordance with the determined routes, when a packet is available, and uses transmit parameters, such as power and transmit antenna weights, determined from the route determination process, from one or more recent link characterizations, or a combination thereof.

Figure 6:
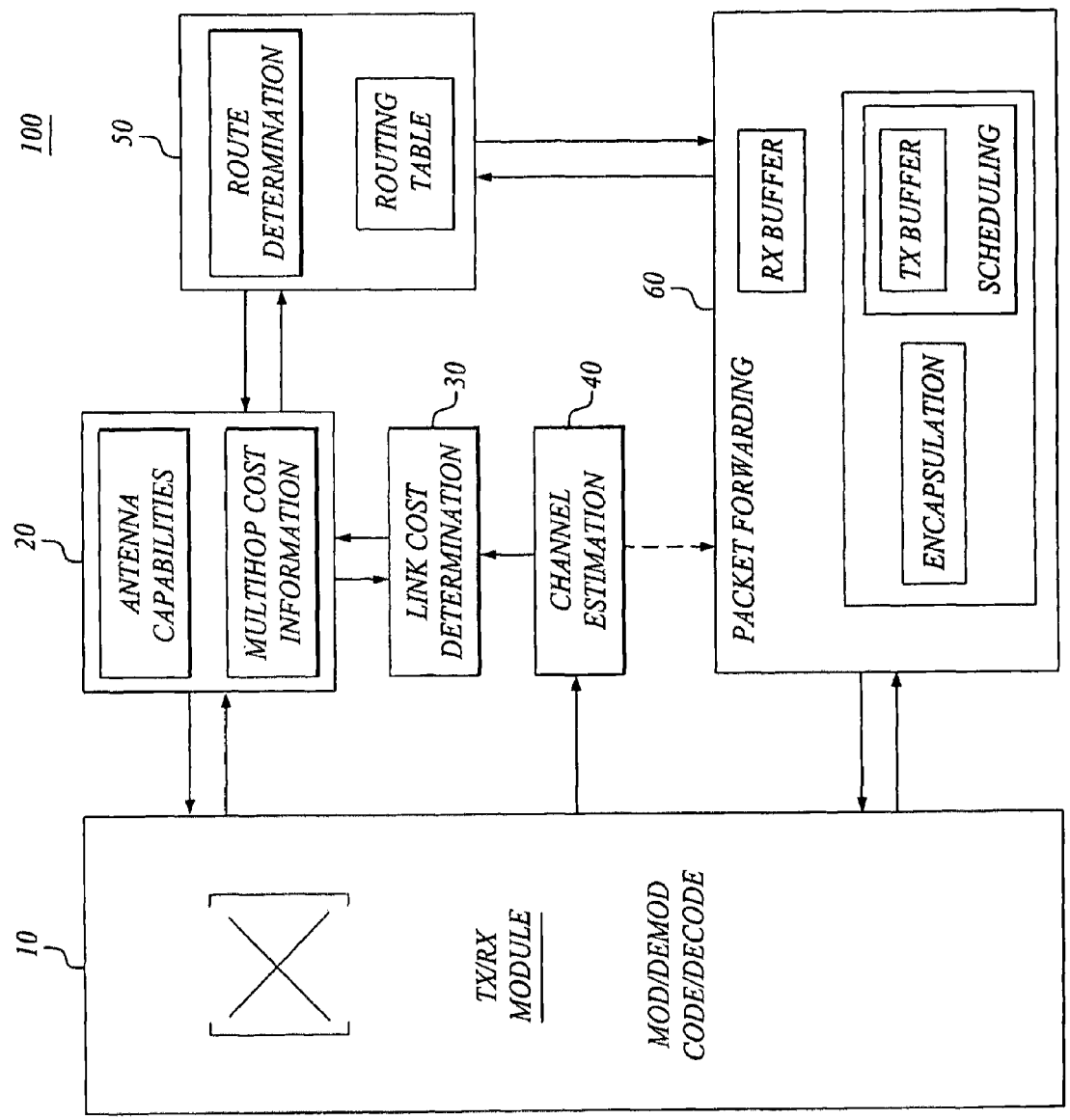
FIG. 6 is a schematic block diagram of a network node according to a preferred but example embodiment.

FIG. 6 is a schematic block diagram of an example network node. The network node 100 basically comprises a transmission/reception (TX/RX) module 10, a routing information module 20, a link cost determination module 30, a channel estimation module 40, a route determination module 50, and a packet forwarding module 60. The transmission/reception module 10 may be configured for multi-antenna operation with an antenna matrix specifying the desired antenna weights for MIMO/MISO/SIMO, Space-Time Coding scheme or other advanced antenna schemes. The transmission/reception module 10 also normally has capabilities for modulation/demodulation and coding/decoding as well as frequency conversion capabilities if required. Information on routing costs and antenna capabilities received from other nodes is transferred from the TX/RX module 10 to the routing information module 20, which maintains multihop cost information and antenna capability information such as the number of antennas and optionally also which antenna communication scheme that is used. The link cost determination module 30 is preferably configured to determine link cost as a function of multi-channel characteristics of a link between two nodes. These multi-channel characteristics may be represented by the number of antennas of the considered network node 100 and the number of antennas of the counterpart node, or represented by an estimation of the channel matrix. The channel estimation module 40 can be used for channel estimation based on pilot signals or even based on "ordinary data" in so-called "blind" channel estimation, and is capable of handling matrix, vector and scalar channel estimation, catering for MIMO, MISO, SIMO, and even SISO channels. Information on the estimated channel matrix is transferred to the link cost determination module for use in determining the link cost. The route determination module 50 receives information on the determined link cost together with complementary multihop cost information (depending on the used routing algorithm) and performs the required route determination procedure. The packet forwarding module 60 is responsible for forwarding packets further on in the network and therefore transfers received packet data temporarily stored in a receive buffer to a transmission buffer for scheduling and encapsulation into new packets for transmission to other network nodes. The packet forwarding module 60 may also instruct the TX/RX module 10 on which transmit parameters to use. Those parameters may be received either from the route determination module 50, or from the channel estimation module 40 (the channel estimates are used to find suitable transmit parameters) for more up to date channel characteristics information. The packets (already having a destination address) to be sent are prepared with at least (next hop) address information in accordance with routing information stored in the routing table. Naturally, the packet forwarding module 60 may also transfer packet data in the receive buffer further on into the network node, e.g. for use in various node-internal applications.

Traditional packet forwarding based on, for example, the Bellman-Ford algorithm is trivial in the sense that there is normally only one next hop choice. Other forwarding protocols, however, such as Cisco's IGRP [4], Random Forward Routing [5], Opportune Routing [6, 7], Selection Diversity Forwarding [8], and Anycast [9] and the more recent Multi-user Diversity Forwarding [10] enables a node to send a received packet to one out of several optional nodes. The forwarding process therefore involves a non-trivial choice to be made amid a set of favorable nodes. These schemes are sometimes denoted Forward-Decision Based Routing, FDBR, and is routing in its most adaptive form, i.e. taking an adaptive decision at each forwarding instance. These more advanced forwarding protocols may operate based on cost information from an underlying route/cost determination protocol such as a shortest path protocol like Bellman-Ford. This forwarding operation, as described in [6]-[10], is advantageous when the link communication quality varies unpredictably due to fading channels or unpredictably varying interference level, whereas [4] and [5] offer some advantages of distributing load over multiple nodes and paths.

In particular, diversity forwarding protocols may even operate based on a route determination protocol that is more customized to diversity forwarding. The link cost determination according to the invention can also be used with great advantage in such customized route determination protocols.

Computational Example

Figure 7:
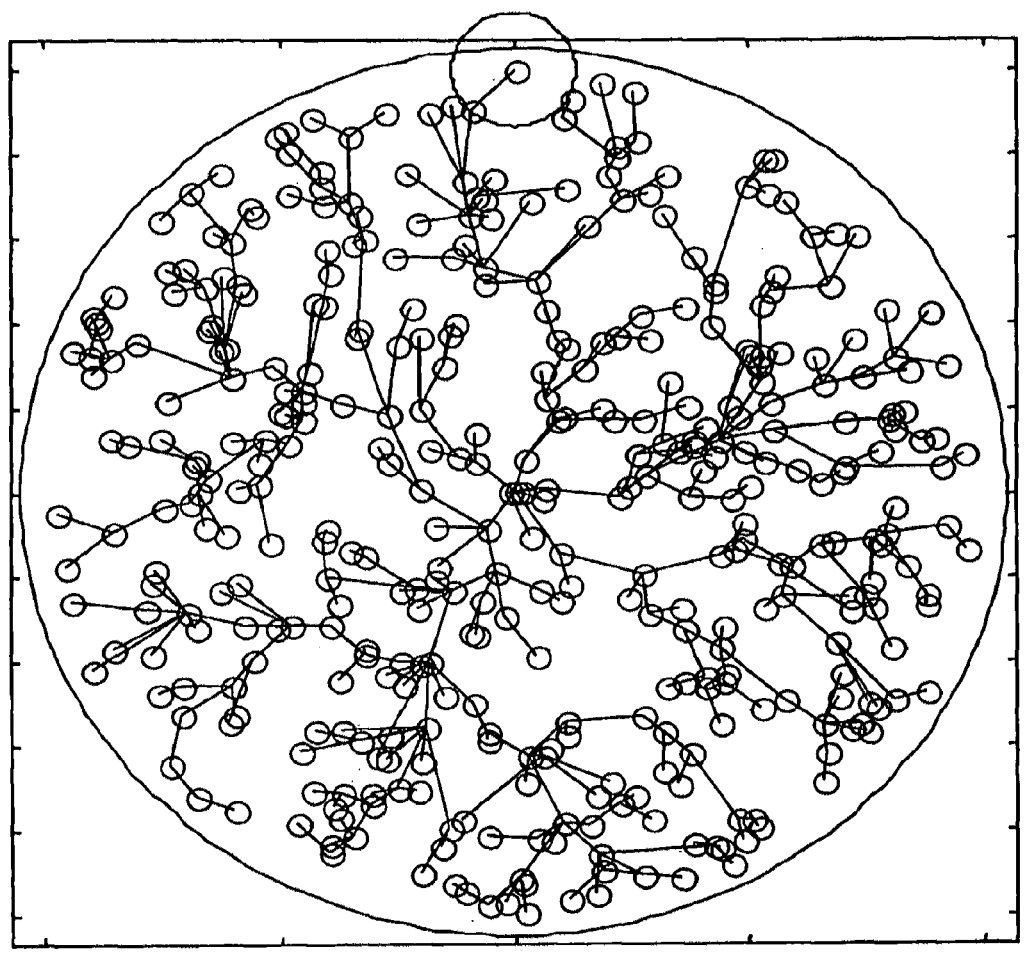
FIG. 7 is a schematic diagram illustrating a computational example of a cost tree with nodes distributed over a normalized circle area.

FIG. 7 is a schematic diagram illustrating a computational example of a cost tree with nodes distributed over a normalized circle area. In this particular example, a given destination is depicted in the middle of the circle, and a cost tree is built from the destination node. This corresponds to the case of pro-active routing. It should though be understood that it is feasible to build the cost tree the other way around, i.e. outgoing from the source—searching for a desired destination, for so-called reactive routing. In the computations of the cost tree, link cost has been determined based on the inverse of average rate with consideration to multi-channel characteristics. The cost tree is determined based on a shortest path algorithm. The nodes have different numbers of antennas in the range between 1 and 10 (randomized), and for simplicity all nodes operate with a given transmit power (the transmit range is indicated for the top node). The diagram of FIG. 7 shows that the model proposed by the technology described herein works, and that it is capable of handling a complex mix of different number of antennas as well as varying type of channels, in particular the channel elements, part of SIMO, MISO or MIMO channels assumed in FIG. 7, are randomly selected between correlated and uncorrelated realizations.

The technology described herein offers route determination in a wireless multihop network with inherent support for arbitrary number of antennas at each relay station (SISO, SIMO, MISO or MIMO), different properties of the channels in terms of correlation/non-correlation, different multiple-antenna schemes, automatic adaptation between different modes of operation, and full backward compatibility with SISO.

The embodiments described above are merely given as examples, and it should be understood that the claims are not limited thereto. Further modifications, changes and improvements that retain the basic underlying principles disclosed and claimed herein are within the scope of the claims.

REFERENCES

[1] US 2003/0161268 A1.
[2] X. Zou, B. Ramamurthy, S. Magliveras, "Routing Techniques for Wireless Ad Hoc Networks Classification and Comparison" Proc. of the Sixth World Multiconference on Systemics, Cybernetics, and Informatics—SCI, July 2002.
[3] P. F. Driessen, G. J. Foschini, "On the capacity formula for multiple input-multiple output wireless channels: A geometric interpretation," IEEE Trans. Commun., vol. 47, pp. 173-176, February 1999.
[4] C. L. Hedrick Rutgers, "Cisco-An introduction to IGPR", 22 Aug., 1991, http://www.cisco.com/warp/public/103/5.html.
[5] R. Nelson, L. Kleinrock, "The spatial capacity of a slotted ALOHA multihop packet radio network with capture", IEEE Transactions on Communications, 32, 6, pp 684-694, 1984.
[6] WO 96/19887.
[7] WO 98/56140.
[8] US 2002/0051425 A1.
[9] S. Jain, Y Lv, S. R. Das, "Exploiting Path Diversity in the Link Layer in Wireless Ad Hoc Networks", Technical Report, WINGS Lab, July 2003.
[10] US 2004/0233918 A1.
[11]) I. Berenguer and X. Wang, "Space-Time Coding and Signal Processing for MIMO Communications—A Primer" Journal of Computer Science and Technology, 18(6), pp. 689-702, November 2003.

The invention claimed is:

1. A method of determining link cost for routing in an at least partially wireless multihop network, said method comprising the steps of:

estimating, for a wireless link between a pair of network nodes where at least one of the nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior; and determining link cost for said wireless link based on the estimated multi-channel characteristics including said M×N dimensional complex channel gain vector or matrix $H_{ij}$, wherein the link cost is determined based on the inverse of the average rate according to:

$$\Delta C_{ij} = 1/\bar{r}_{ij},$$

where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, E{ ... } is an optional expectation value, Det{ ... } is the determinant, $I_i$ is the identity matrix of dimension M by M, $P_i$ is the transmit power of node $v_i$, $\sigma_N^2$ is one or both of the noise level at node $v_j$ and average interference apart from receiver noise, and H is the Hermitian operator.

2. A method for link-cost based route determination in an at least partially wireless multihop network, said method comprising the steps of:

estimating, for a wireless link between a pair of network nodes where at least one of the nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior; and determining link cost for said wireless link based on the estimated multi-channel characteristics including said M×N dimensional complex channel gain vector or matrix $H_{ij}$, wherein the link cost is determined based on the inverse of the average rate according to:

$$\Delta C_{ij} = 1/\bar{r}_{ij},$$

where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, E{...} is an optional expectation value, Det{...} is the determinant, $I_i$ is the identity matrix of dimension M by M, $P_i$ is the transmit power of node $v_i$, $\sigma_N^2$ is one or both of the noise level at node $v_j$ and average interference, and H is the Hermitian operator; and performing route determination at least partly based on said determined link cost.

3. A method for link-cost based routing of data in an at least partially wireless multihop network, said method comprising the steps of:

estimating, for a wireless link between a pair of network nodes where at least one of the nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior; and determining link cost for said wireless link based on the estimated multi-channel characteristics including said M×N dimensional complex channel gain vector or matrix $H_{ij}$, wherein the link cost is determined based on the inverse of the average rate according to:

$\Delta C_{ij} = 1/\bar{r}_{ij}$, where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, E{...} is an optional expectation value, Det{...} is the determinant, $I_i$ is the identity matrix of dimension M by M, $P_i$ is the transmit power of node $v_i$, $\sigma_N^2$ is one or both of the noise level at node $v_j$ and average interference, and H is the Hermitian operator;

performing route determination at least partly based on said determined link cost; and forwarding data from a given node to at least a neighbor node on the path to a given destination node in accordance with said route determination.

4. The method of claim 1, wherein link cost is determined also based on knowledge of the multiple-antenna communication scheme used between the nodes.

5. The method of claim 4, wherein link cost is determined according to a function that is dependent on the multiple-antenna communication scheme.

6. The method of claim 5, further comprising the step of selecting multiple-antenna communication scheme from those schemes that are supported by both of the network nodes so as to optimize link cost.

7. The method of claim 1, wherein the average link rate is determined based on the expectation value of said M×N dimensional complex channel gain vector or matrix $H_{ij}$ for a given transmit power $P_i$.

8. The method of claim 1, wherein said network is a fully wireless multihop network.

9. The method of claim 1, wherein said network is an ad-hoc multihop network.

10. The method of claim 1, wherein said pair of network nodes includes a mobile station and a base station, and handover between base stations in a cellular network is part of the routing process.

11. An arrangement for determining link cost for routing in an at least partially wireless multihop network, said arrangement comprising:

means for estimating, for a wireless link between a pair of network nodes where at least one of the nodes is configured for operation with multiple antennas to provide for multiple channels, multi-channel characteristics between the nodes including an M×N dimensional complex channel gain vector or matrix $H_{ij}$ between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior; and means for determining link cost for said wireless link based on the estimated multi-channel characteristics including said M×N dimensional complex channel gain vector or matrix $H_{ij}$, wherein the link cost is determined based on the inverse of the average rate according to:

$\Delta C_{ij} = 1/\bar{r}_{ij}$, where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, E{...} is an optional expectation value, Det{...} is the determinant, $I_i$ is the identity matrix of dimension M by M, $P_i$ is the transmit power of node $v_i$, $\sigma_N^2$ is one or both of the noise level at node $v_j$ and average interference, and H is the Hermitian operator.

12. An arrangement for link-cost based route determination in an at least partially wireless multihop network, said arrangement comprising:

means for estimating, for a wireless link between a pair of network nodes where at least one of the nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior; and means for determining link cost for said wireless link based on the estimated multi-channel characteristics including said M×N dimensional complex channel gain vector or matrix $H_{ij}$, wherein the link cost is determined based on the inverse of the average rate according to:

$$\Delta C_{ij} = 1/\bar{r}_{ij},$$

where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, E{ ... } is an optional expectation value, Det{ ... } is the determinant, $I_i$ is the identity matrix of dimension M by M, $P_i$ is the transmit power of node $v_i$, $\sigma_N^2$ is one or both of the noise level at node $v_j$ and average interference, and H is the Hermitian operator; and means for performing route determination at least partly based on said determined link cost.

13. An arrangement for link-cost based routing of data in an at least partially wireless multihop network, said arrangement comprising:

means for estimating, for a wireless link between a pair of network nodes where at least one of the nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior; and means for determining link cost for said wireless link based on the estimated multi-channel characteristics including said M×N dimensional complex channel gain vector or matrix $H_{ij}$, wherein the link cost is determined based on the inverse of the average rate according to:

$$\Delta C_{ij} = 1/\bar{r}_{ij},$$

where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, E{ ... } is an optional expectation value, Det{ ... } is the determinant, $I_i$ is the identity matrix of dimension M by M, $P_i$ is the transmit power of node $v_i$, $\sigma_N^2$ is one or both of the noise level at node $v_j$ and average interference, and H is the Hermitian operator;

means for performing route determination at least partly based on said determined link cost; and means for forwarding data from a given node to at least a neighbor node on the path to a given destination node in accordance with said route determination.

14. The arrangement of claim 11, wherein said determining means is operable for determining link cost also based on knowledge of the multiple-antenna communication scheme used between the nodes.

15. The arrangement of claim 14, wherein said determining means is operable for determining link cost according to a function that is dependent on the multiple-antenna communication scheme.

16. The arrangement of claim 15, further comprising means for selecting multiple-antenna communication scheme from those schemes that are supported by both of the network nodes so as to optimize link cost.

17. The arrangement of claim 11, wherein said determining means comprises means for determining the average link rate based on the expectation value of the M×N dimensional complex channel gain vector or matrix $H_{ij}$ for a given transmit power $P_i$.

18. The arrangement of claim 11, wherein said network is a fully wireless multihop network.

19. The arrangement of claim 11, wherein said network is an ad-hoc multihop network.

20. The arrangement of claim 11, wherein said pair of network nodes includes a mobile station and a base station, and handover between base stations in a cellular network is part of the routing process.

21. The arrangement of claim 11, wherein said arrangement is implemented in at least one network node in the multihop network.

22. The arrangement of claim 12, wherein said means for performing route determination is operable for performing route determination also based on link cost for at least one further wireless or wired link in the multihop network.

23. A method for path selection from a mobile station to a mobility anchor point including selection among base stations in a cellular network, said mobile station being capable of communicating with said base stations via respective wireless links, said method comprising the steps of:
   estimating, for each one of said wireless link, where at least one of the involved nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior;
   determining, for each one of said wireless links, link cost based on the estimated multi-channel characteristics including said M×N dimensional complex channel gain vector or matrix $H_{ij}$, wherein the link cost is determined based on the inverse of the average rate according to:

$\Delta C_{ij} = 1/\bar{r}_{ij}$, where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, $E\{\ldots\}$ is an optional expectation value, $Det\{\ldots\}$ is the determinant, $I_i$ is the identity matrix of dimension M by M, $P_i$ is the transmit power of node $v_i$, $\sigma_N^2$ is one or both of the noise level at node $v_j$ and average interference, and H is the Hermitian operator; and
   selecting an appropriate base station to use for mobile communication based on accumulated link cost along the respective path from said mobile station to said mobility anchor point.

24. An arrangement for path selection from a mobile station to a mobility anchor point including selection among base stations in a cellular network, said mobile station being capable of communicating with said base stations via respective wireless links, said arrangement comprising:
   means for estimating, for each one of said wireless link, where at least one of the involved nodes is configured for operation with multiple antennas to provide for multiple channels, multi-channel characteristics between the nodes including an M×N dimensional complex channel gain vector or matrix $H_{ij}$, between node $v_i$ and node $v_j$:

$$H = \begin{bmatrix} h_{11} & \cdots & h_{1N} \\ \vdots & \ddots & \vdots \\ h_{M1} & \cdots & h_{MN} \end{bmatrix}$$

where $h_{mn}$ is a complex representation of the channel between transmit antenna n in a first one of said nodes and receive antenna m in a second one of said nodes, where at least one of N and M is greater than 1 to provide for multi-channel behavior;
   means for determining, for each one of said wireless links, link cost based on the estimated multi-channel characteristics including said M×N dimensional complex channel gain vector or matrix $H_{ij}$, wherein the link cost is determined based on the inverse of the average rate according to:

$\Delta C_{ij} = 1/\bar{r}_{ij}$, where the average rate for a link from node $v_i$ to $v_j$ is determined based on the complex channel gain vector or matrix $H_{ij}$ of dimension M×N, defined between node $v_i$ and node $v_j$ according to:

$$\bar{r}_{ij} = B \cdot E\left(\log_2\left(Det\left(I_i + \frac{P_i}{N \cdot \sigma_N^2} \cdot H_{ij} \cdot H_{ij}^H\right)\right)\right),$$

where B is the bandwidth, which may be neglected if only one common bandwidth is used in the whole system, $E\{\ldots\}$ is an optional expectation value, $Det\{\ldots\}$ is the determinant, $I_i$ is the identity matrix of dimension M by M, $P_i$ is the transmit power of node $V_i$, $\sigma_N^2$ is one or both of the noise level at node $v_j$ and average interference, and H is the Hermitian operator; and
   means for selecting an appropriate base station to use for mobile communication based on accumulated link cost along the respective path from said mobile station to said mobility anchor point.

25. The method of claim 1, wherein the link cost is computed by assuming that power constrained waterfilling of the eigenchannels is performed.

26. The arrangement of claim 11, wherein said means for determining link cost is configured to compute the link cost by assuming that power constrained waterfilling of the eigenchannels is performed.

* * * * *